United States Patent [19]

Fukuda

[11] Patent Number: 4,671,184

[45] Date of Patent: Jun. 9, 1987

[54] SYSTEM FOR PROPELLING TWO-WHEELED GOLF CARTS ALONG A TRACK

[76] Inventor: Tomiichi Fukuda, 3-23-18, Denenchofu, Ota-Ku, Tokyo, Japan

[21] Appl. No.: 714,897

[22] Filed: Mar. 22, 1985

[30] Foreign Application Priority Data

Mar. 22, 1984 [JP] Japan ................................. 59-54643

[51] Int. Cl.⁴ ........................ B61B 9/00; B61B 13/04; E01B 25/14
[52] U.S. Cl. .................................. 104/118; 104/140; 104/191; 104/245; 105/141
[58] Field of Search ................................ 104/139–145, 104/189, 191, 194, 245, 247, 118, 242; 105/141

[56] References Cited

U.S. PATENT DOCUMENTS

| | | | |
|---|---|---|---|
| 275,378 | 4/1883 | Haddock | 104/140 |
| 359,421 | 3/1887 | Boyer | 104/191 |
| 364,500 | 6/1887 | Dougherty | 104/191 |
| 378,918 | 3/1888 | Bierbach | 104/140 |
| 386,824 | 7/1888 | Holmes et al. | 104/140 |
| 387,592 | 8/1888 | Hunt | 104/140 |
| 727,222 | 5/1903 | Smith | 104/139 |
| 1,152,183 | 8/1915 | Kiansten et al. | 104/246 |
| 2,240,947 | 5/1941 | Wilson | 104/139 |
| 3,838,648 | 10/1974 | Dahlberg et al. | 104/140 |
| 4,440,091 | 4/1984 | Burgess | 104/139 |
| 4,592,284 | 6/1986 | Fukuda | 104/191 |

FOREIGN PATENT DOCUMENTS

| | | | |
|---|---|---|---|
| 1266226 | 10/1962 | Fed. Rep. of Germany | 104/245 |
| 1415 | of 1883 | United Kingdom | 104/191 |
| 8395 | of 1905 | United Kingdom | 104/143 |

Primary Examiner—Randolph A. Reese
Attorney, Agent, or Firm—Wenderoth, Lind & Ponack

[57] ABSTRACT

A golf cart propelling system includes a rail formed by a plurality of channel members, each having a U-shaped cross section defined by spaced side walls joined at lower ends thereof by a bottom wall. The side walls have at upper ends thereof flanges extending inwardly toward each other and defining therebetween a longitudinal groove. The channel members are buried in the ground to define a rail extending through selected locations of a golf course with portions of the flanges flush with the ground surface and with the longitudinal grooves of the channel members defining a continuous rail groove. A golf cart has front and rear wheel members running on the flange portions of the rail. Each wheel member has a width no greater than the width of the exposed flange portions. The golf cart is prevented from falling sideways from the rail by at least one vertical shaft attached to the golf cart and extending downwardly therefrom through the groove into the interior of the rail. At least one vertical roller is mounted on the vertical shaft for rotation in a vertical plane in contact with an inner surface of the flanges of the channel members. At least one horizontal roller is mounted on the vertical shaft for rotation in a horizontal plane in contact with inner surfaces of the side walls of the channel members.

6 Claims, 9 Drawing Figures

SYSTEM FOR PROPELLING TWO-WHEELED GOLF CARTS ALONG A TRACK

BACKGROUND OF THE INVENTION

The present invention relates to systems for propelling around a golf course golf carts or caddy carts of the type for carrying golf clubs, bags and other articles.

More particularly, the present invention is directed to various systems and elements for enabling the passage around the terrain of a golf course of a two-wheeled golf cart which is similar to a bicycle in that it has a front wheel and a rear wheel running on a rail buried in the ground and extending through selected locations of the golf course, the upper surface of the rail being flush with the ground surface, and the width of the tread of the wheels of the golf cart being less than the width of the top surface of the rail exposed above the ground, whereby the wheels of the cart do not damage the grass on opposite sides of the rail. Further particularly, the present invention is directed to such systems whereby the bicycle-like golf carts are prevented from turning over sideways or slipping from the rail.

There are known caddy carts provided with at least three wheels arranged in front and rear, and such carts can be moved over a golf course stably without turning over sideways. However, there is no known two-wheeled cart having, similar to a bicycle, a front wheel and a rear wheel, which can be moved along a narrow path on the fairways of a golf course without damaging the grass or turning over sideways.

There has been proposed a mono-rail type of caddy cart system wherein a rail is provided above the ground or in a wide trench (for example 25 cm wide) formed in the ground. It also has been proposed to form such rail of U-shaped channel members embedded in the ground. In such case however, a large width of the mono-rail is exposed above ground, such that golf balls often bounce irregularly therefrom and are lost. In addition, it is necessary to locate the rail in the rough areas of the golf course some distance from the fairways, since the rail detracts from the appearance of the landscape of scenery of the fairways. Accordingly, a caddy or player has to walk substantial distances between the cart and the position of a golf ball, thus wasting time and energy. In order to avoid such problems, a player might be tempted to use an unsuitable club, thereby effecting his score and detracting from enjoyment of the game. Such system also extends the time required for a round of golf and thereby restricts the number of players allowed to employ the golf course. Even further, if a golf ball lands close to the rail, when such golf ball next is hit it could rebound from the rail above the ground or on the ground, which is dangerous to the players, or the player might be obliged to take a "drop". Such occurrences are inconvenient to the progress of the game. Additionally, a rail above the ground or a wide rail embedded in the ground are incompatible with the natural scenery of a golf course. In order to overcome these problems, such rails must be positioned far from the fairways, and preferably be hidden by trees or bushes.

The carts usually are driven electrically and are heavy (for example about 85 kg), and an operator for controlling the cart is required. The cart therefore seriously damages the grass so that it is necessary to construct a paved lane of concrete or asphalt, for example of about 1.5 m width, for such electrically driven carts. Such lanes or paths must also be located far from the fairways, for example between 50 to 100 m, which again raises the problems of wasted time and energy. In addition, it often occurs that a golf ball hitting such lane or path will rebound in an unexpected direction, whereby it becomes lost or out of bounds, thereby seriously impairing the players enjoyment of the game.

A newly developed caddy cart propelling system recently has been proposed, whereby an electromagnetic induction type caddy cart (having the brand name "Green Boy" or "High Cart Carry") is employed. This system has an electromagnetic cable buried in a paved lane (about 1.5 m wide) on which the cart runs, and a sensor for detecting a magnetic field generated by such cable and determining direction of movement, whereby the cart runs in an unattended manner by remote control means. In this system, the same drawbacks as are discussed above are encountered.

The known, old fashioned two-wheeled cart having left and right wheels and supported by hand is free from the above problems. This type of cart does not turn over sideways and does not damage the grass because it is not heavy. This type of caddy cart therefore still is popular on golf courses which are comparatively flat. Also known are similar types of caddy carts capable of carrying plural bags, for example four bags. Such arrangements particularly are employed at golf courses having a shortage of caddies. However, the weight of four bags is approximately 40 kg, and the total loaded weight including the cart easily can reach 65 kg. Therefore, a considerable amount of effort is required even on flat ground to convey such carts, and the wheels of the cart become heavily loaded and can damage the grass of the golf course. Play often is interrupted by delays in the arrival of the cart, particularly when the cart must be pushed up a slope, and when the caddies must provide additional services such as replacing or covering divets and smoothing bunkers. Most golf courses have many slopes, and therefore it is hard work for the caddies to accompany the players while handling caddy carts carrying golf clubs and other articles. As a result, play often is prolonged, and this impairs the enjoyment of the game.

The most important concern for a golf course is to reduce damage to the grass which has a vital impact on the playing of the game. Hence, the ultimate demand is for minimization of damage to the grass. Unfortunately however, existing automatic transportation systems, which otherwise would minimize damage to the grass, have drawbacks as mentioned above and therefore are not generally employed.

SUMMARY OF THE INVENTION

With the above discussion in mind, it is an object of the present invention to provide a system for automatically propelling golf carts of the caddy type around a golf course, while avoiding damage to the grass and at the same time overcoming the above discussed and other disadvantages of prior art systems.

A further object of the present invention is to provide such a system which can be operated safely and smoothly to automatically propel carts which are either self-driven by a prime mover or which can be towed by a rope or cable movably extending through a rail buried in the golf course, without requiring assistance of a caddy.

The above and other objects are achieved in accordance with the present invention by the provision of a cart operating or propelling system including a rail buried in the ground of a golf course to extend through selected locations thereof, including the fairways. The rail is formed by a plurality of channel members, each having a U-shaped cross section defined by spaced side walls joined at lower ends thereof by a bottom wall, the side walls having at upper ends thereof flanges extending inwardly toward each other and defining therebetween a longitudinal groove. The channel members are combined or made integral to form the rail, with portions of the flanges being flush with the ground surface and with the longitudinal grooves of the channel members defining a continuous longitudinal groove of the rail. The system includes structure for preventing the cart from turning over sideways. Further, if the cart is of the type towed by a rope or cable, the system includes structure for supporting the two rope. The rail need not run only through the rough areas of the golf course, but also can extend through the fairways thereof and is flush with the ground surface.

The width of the groove of the rail is smaller than the diameter of a golf ball, such that a golf ball cannot drop through the groove. The width of the portions of the rail exposed to the ground surface, including the exposed flange portions and the groove, can be as narrow as approximately 8 cm. However the overall width of the channel member embedded in the ground can be as much as about 13 cm. The exposed surfaces of the rail are covered by flexible cosmetic members made of a substance similar to artificial turf of almost the same color and elasticity as real grass. One side of each such flexible cosmetic member may be attached to the respective channel member so that the cosmetic members slightly overlap above the longitudinal rail groove. If the cart is of the type towed by a rope or cable, the two rope is positioned to extend through the interior of the rail, and support structure is provided within the interior of the rail to support the two rope. The supporting structure comprises a plurality of roller assemblies mounted within the rail, each assembly including support and guide rolls having axes extending in the same plane transverse to the longitudinal direction of the rail, each support and guide roller having the form substantially of a cylinder constricted at the mid-portion thereof, thus defining a curved surface. The support and guide rollers of each assembly are arranged at predetermined positional relationships with respect to each other, and specifically such that the curved surfaces thereof substantially are extensions of each other.

When a caddy cart runs over the exposed portion of the rail, a vertical shaft attached to the cart separates the flexible cosmetic members laterally. At other times however, the flexible cosmetic members overlap and close the top of the groove to prevent sand, soil and other foreign matter entering the interior of the rail. The flexible cosmetic members have an appearance similar to that of real grass so that the presence of the rail does not spoil the appearance of the golf course, even when the rail extends through the fairways. Also, even if a golf ball hits the rail, it will not bounce irregularly, whereby enjoyment of the game is not substantially effected. The golf or caddy cart is designed to carry four bags at a time such that the weight of all of the bags is applied uniformly to a central portion of the cart. The means for preventing the cart from turning sideways is mounted on the vertical shaft which is attached to the cart and which extends through the groove into the interior of the rail. Such structure includes at least one vertical roller mounted on the vertical shaft for rotation in a vertical plane in contact with an inner surface of the flanges of the channel members of the rail, and at least one horizontal roller mounted on the vertical shaft for rotation in a horizontal plane in contact with inner surfaces of the sidewalls of the channel members of the rail. The vertical roller prevents the cart from turning over sideways, while the horizontal roller ensures that the cart runs along the exposed surfaces of the rail smoothly and safely, without damaging the grass on opposite sides of the rail.

If the cart is of the self-driven type, then the cart is provided with a prime mover, such as a motor, which drives at least one wheel of the cart so that the cart is moved along the rail. On the other hand, if the cart is of the type to be towed by a tow rope or cable, then the cart is provided with means for attaching the cart to the tow rope and to release such attachment selectively. Since such selective attachment structure is operable from above the tow rope, it is not possible to support the tow rope by ordinary structures such as rollers in contact with the upper side of the tow rope. Additionally, in order to prevent interference between the attachment structure and the tow rope support structure, it is necessary that the attachment structure move along a path which is separated from the rope. When the rail extends substantially rectilinearly, no difficulty is encountered, since the tow rope can be supported simply by rollers in contact with the lower side of the tow rope, while the upper side of the tow rope is maintained free from contact with any rollers. However, if the rope extends along a valley or along a transient upward curving region between a flat area and a slope, then if the rope is not pressed from above, the rope may spring upwardly due to tension thereon. One solution to such problem is disclosed in Japanese laid-open patent No. 130855/1982. This proposal however has a complicated construction and is difficult to put into practice.

Such difficulties however are overcome in accordance with the present invention. Thus, the tow rope contacts the support rollers and is allowed to curve in the horizontal plane at a curvature of about 5° between adjacent support rollers and is in contact with guide rollers and allowed to curve between adjacent guide rollers in the vertical plane at an angle of up to 4°. As a result, the tow rope is stably supported even in vertically and horizontally curving regions of the rail. This enables the attachment structure of the cart to move without interference with the tow rope. With this arrangement, when the attachment structure holding the tow rope passes a guide roller, the rope is pulled toward the guide roller by the tension of the rope. That is, a reaction force is applied by the rope to the guide roller. However, since this reaction force is safely received by the curved surface of the roller, the rope moves stably past the roller without coming off the roller surface. Thus, it has been confirmed that the rope can run along upwardly curving regions safely wihout coming off the rollers, provided at the above horizontal curvature and vertical flexure relationships are maintained. When the towing rope is suspended so as to come into contact with the curved surface of a support roller, the reaction force is applied along the curved surface of the support roller toward the center of radius of curvature, and accordingly the rope will run smoothly while being guided by the curved surface of the guide rollers which substantially follow or are extensions of the curved surface of the support rollers. With such arrangement, it is possible to extend the rail along lefthand or righthand curves, vertical curves and along upwardly sloping regions.

BRIEF DESCRIPTION OF THE DRAWINGS

The above and other objects, features and advantages of the invention will be apparent from the following detailed description of preferred embodiments thereof, with reference to the accompanying drawings, wherein.

DETAILED DESCRIPTION OF THE INVENTION

In accordance with the present invention, there is provided a rail formed of a plurality of joined or integrally formed channel members 1. The channel member has a substantially U-shaped cross section defined by spaced side walls joined at lower ends thereof by a bottom wall, the side walls having at upper ends thereof flanges 2 extending inwardly toward each other and defining therebetween a longitudinal groove 4. The flanges 2, or at least portions thereof, define the exposed rail surfaces along which runs a cart 8.

Figure 2:
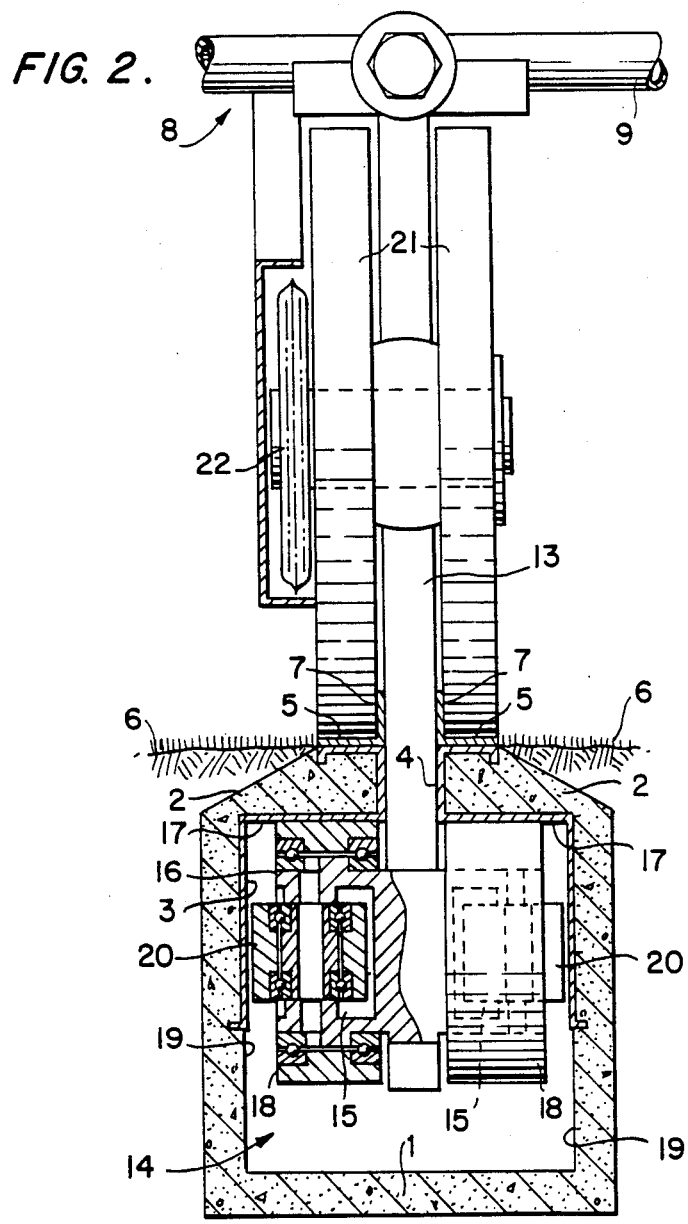
FIG. 2 is a transverse section, on an enlarged scale, thereof.

As illustrated in the section of FIG. 2, the channel member 1 may be formed from a plastic material, such as a resin concrete, and may be provided with internal reinforcement members 3 such as iron or other metal sheets.

Groove 4 is of a width less than the diameter of a golf ball. The upper surface of each flange 2 exposed at the ground surface has a minimum width which can bear the weight of cart 8, for example about 20 mm. The upper surfaces of flanges 2, including the groove 4 formed therebetween, constitute an exposed surface 5 of the channel member 1. The portions of the channel member other than such exposed surfaces are buried beneath the ground.

Figure 5:
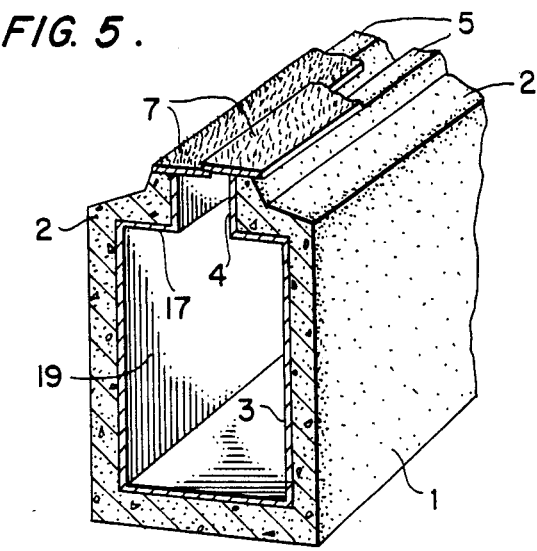
FIG. 5 is a partial sectioned perspective view of a channel member forming a rail according to the present invention.

Flexible cosmetic members 7 of an elastic material and with color similar to that of real grass on the adjacent ground are attached to the flange portions 2 so that free edges of the members 7 slightly overlap at a position above the groove to prevent soil, sand and rainwater from entering the interior of the channel member (see particularly FIG. 5).

Figure 3:
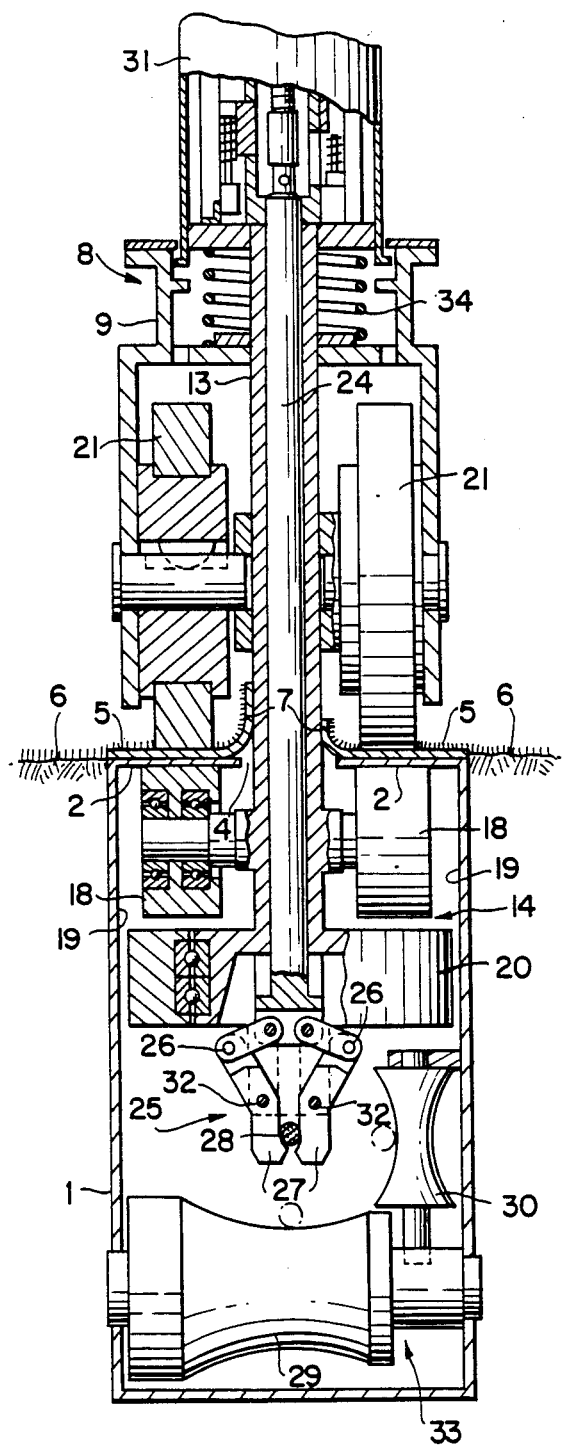
FIG. 3 is a view similar to FIG. 1 but of an embodiment of the invention incorporating a cart towed by a tow rope.

FIG. 3 illustrates another embodiment of the channel member 1 which is pressed from sheet steel of a substantial thickness so that the exposed surface 5 has a width substantially equal to the total width of channel member 1. This embodiment of the channel member therefore can be formed easily at reduced cost and can be used in areas where there is no danger of golf balls hitting the rail, for example in areas of the cart house or in rough areas.

Figure 4:
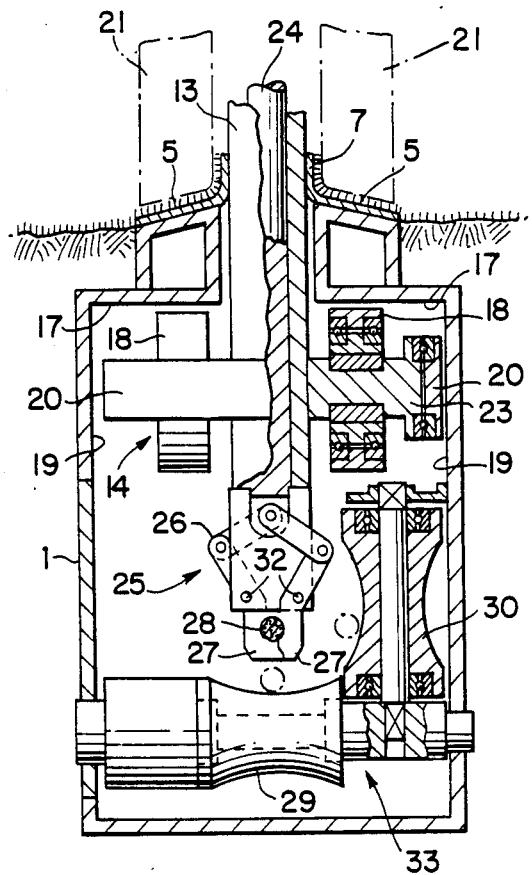
FIG. 4 is a partial section similar to FIG. 3 but of a modified embodiment thereof.

FIG. 4 shows yet another embodiment of a channel member 1 which is formed from sheet steel. In this embodiment however, the width of the exposed surface 5 is reduced so that the channel member can be employed in fairways. This embodiment also provides that the side portions of the exposed flange surfaces 5 slope at a gradient, for example of 10°, with the crests thereof at the center. The flexible members 7 cover exposed surface 5. This arrangement prevents the possibility of a golf ball resting on the rail, and also additionally operates to prevent rain water from entering into the channel member.

The embodiment of the channel member 1 shown in FIG. 5 is similar to that of the embodiment shown in FIG. 2, except that a shaped steel sheet 3 of comparatively small thickness defines the entire inner structure of the channel member, with an elastic material such as resin concrete formed about steel sheet 3. Furthermore, the exposed portions of the flanges 2 are stepped to provide a smaller width of the exposed surface 5. This embodiment of the channel member can be formed to have comparatively precise internal dimensions.

Referring again to FIGS. 1 and 2, the cart employed in this embodiment is of the self-driven type including a frame 9 having four bag storage and support areas 10 so that four bags can be carried at a time, two at the front and two at the back of the cart. A box or unit 11 is provided between the front and rear bag storage areas and accommodates a driving unit including battery, motor and reduction gears. Also, a basket 12 may be provided above unit 11 to accommodate small golfing articles. These parts are arranged over frame 9 so that the load is distributed uniformly.

Vertical shafts 13 are mounted at front and rear portions of frame 9 to extend downwardly therefrom through groove 4 to the interior of the channel member 1. Front and rear edges of shafts 13 forcibly separate flexible cosmetic members 7, as is apparent in FIG. 2. Wheels 21 are mounted on cart 8, and in the arrangement illustrated in FIG. 2, wheels 21 are attached to upper portions of vertical shafts 13.

Each vertical shaft 13 has attached thereto structure for preventing the cart from turning over or falling sideways from the rail. In the embodiment of FIG. 2, such structure includes a horizontal shaft 16 attached to the lower end of vertical shaft 13. Horizontal shaft 16 has at opposite ends thereof recesses 15 defining vertical support portions. Vertical rollers 18 are rotatably mounted about opposite ends of horizontal shaft 16 to rotate in vertical planes in contact with inner surfaces of respective flanges 2, and specifically with surface portions 17 of the metal reinforcement members 3. Furthermore, there are provided horizontal rollers 20 rotatably mounted about the vertical support portions defined by the recesses 15. Horizontal rollers 20 rotate in a horizontal plane in contact with inner surfaces 19 of respective side walls of channel member 1, and specifically in contact with vertical portions of metal reinforcement members 3.

Additionally, front and rear wheel members are attached to respective vertical shafts 13 and are driven by the motor in unit 11 through transmissions 22. Each wheel member comprises a pair of wheels 21 mounted on opposite sides of the respective vertical shaft 13, each wheel 21 running on a respective exposed surface 5 of a respective flange 2 of the channel member 1. Thus, the cart 8 actually has a total of four wheels 21, i.e. two front wheel and two rear wheels. However, the two wheels 21 of each of the front and rear wheel members have a total width of only about 80 mm, including the width of the gap provided between each pair of wheels and through which extends the respective vertical shaft 13. Therefore, the cart actually can be regarded as a virtually two-wheeled cart, in a manner similar to an ordinary bicycle, and is distinguished from an ordinary cart which is stabilized by four wheels, i.e. two substantially spaced front wheels and two substantially spaced rear wheels.

FIG. 3 shows an embodiment of the structure for preventing the cart from turning over which includes plural vertical rollers 18 mounted on vertical shaft 13 for rotation and respective vertical planes in contact with inner surfaces of the respective flanges 2. However, the horizontal roller 20 is mounted on the vertical shaft 13 at a position below vertical rollers 18. In this embodiment also, the vertical shaft 13 is shown as being connected to a motor 31 which is biased upwardly by a relatively strong spring 34, so that the vertical rollers 18 are pressed against the inner surfaces of the flanges 2, i.e. the flanges 2 essentially are gripped between the wheels 2 and the vertical rollers 18. This arrangement ensures smooth running of the wheels over joints between adjacent channel members.

FIG. 4 shows an embodiment of the structure for preventing the cart from turning over sideways wherein a stationary wheel 23 is formed on vertical shaft 13, with a horizontal roller 20 mounted for rotation about stationary wheel 23 to rotate in a horizontal plane in contact with the inner surface 19 of one side wall of the channel member. Plural vertical rollers 18 are mounted on arm portions of stationary wheel 23 so that they can rotate in vertical planes in contact with the lower surfaces 17 of the flanges 2. Attention is directed to the fact that in this embodiment, since the exposed surface 5 is tapered, wheels 21 must have complementary contours.

FIGS. 3 and 4 each illustrate a further feature of the present invention, i.e. wherein the cart is propelled by being attached to a tow rope or cable 28 which extends longitudinally through the interior of the rail. In each of the embodiments of FIGS. 3 and 4, a vertically slidable shaft 24 extends through vertical shaft 13, and an attachment device 25 is provided at the lower end of slidable shaft 24. The details of the attachment device 25 are disclosed in Japanese laid-open patent No. 130855/1982. Briefly, slidable shaft 24 is connected to motor 31 which can be started and stopped by manual or remote control, so that slidable shaft 24 is moved upwardly and downwardly in accordance with operation of motor 31 to selectively unclamp or clamp tow rope 28 by jaws 27 which cooperate with each other through the action of links 26 which are pivoted at 32.

Tow rope 28 is arranged in endless form and extends through the interior of the rail throughout the golf course. Support structure 33 is provided for supporting the tow rope 28 within the interior of the rail. The support structure 33 comprises a plurality of roller assemblies mounted within the rail, each roller assembly comprising a plurality of pairs of rollers, i.e. a horizontal support roller 29 and a vertical guide roller 30. Each of the support and guide rollers has the form substantially of a cylinder constricted at the mid-portion thereof, thus defining a curved outer roller surface. The support and guide rollers of each assembly are positioned such that the curved surfaces thereof substantially are extensions of each other and thereby provide a connected substantially continuous curved surface within a plane containing the axes of the rollers. By this arrangement, when the tow rope 28 is transferred from support roller 29 to guide roller 30, the tow rope is not caught in a transition area between the two rollers. The attachment device 25 can be provided only at the front wheels, as viewed in the direction of movement of the cart, or attachment devices may be provided adjacent both the front and rear wheels.

In the embodiments of FIGS. 2, 3 and 4, all of the wheels 21 are mounted on vertical shafts 13. Such arrangement however is not essential, and wheels 21 may be carried by support members provided adjacent the vertical shafts. In such arrangement, each wheel member would be a solid wheel having a tread width the same width as the exposed surface 5, at both the front and rear of the cart. In such case, the cart 8 then would be supported by a single front wheel and a single rear wheel in a manner similar to an ordinary bicycle.

Figure 1:
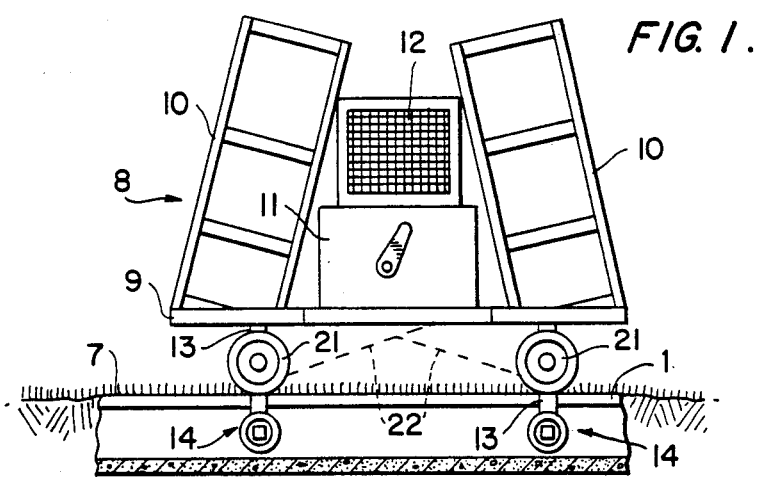
FIG. 1 is a somewhat schematic side elevation of a self-propelled caddy cart employed in the system of the present invention.

In use of the device, four golf bags are placed in the respective bag supports 10 of the cart 8, and small bags and similar miscellaneous articles are placed in basket 12. If the cart 8 is of the self-driven type, as shown in FIGS. 1 and 2, the motor of unit 11 is started by turning on a switch, so that the power of the motor is transmitted to wheels 21 through transmissions 22 to propel the cart. When the cart arrives at a predetermined position, for example near the tee of the first hole, the motor switch is turned off by remote control or by a switch actuator provided at a predetermined position of the rail, such that the cart stops. On the other hand, if the cart 8 is of the towed type, as shown in FIGS. 3 and 4, motor 31 is started by, for example, remote control, so that slidable shaft 24 moves downwardly. Consequently, jaws 27 are rotated about shafts 32 by the action of links 26 to clamp therebetween tow cable or rope 28. The cart 8 therefore is towed by rope 28 to move along the rail at the same speed as movement of the rope. When the cart has reached a selected position, for example near the first tee, motor 31 is reversed so that rope 28 is released, thereby allowing the cart to stop.

In either case, the running speed of the cart may be about 60 m/sec, which is substantially equal to or slightly more than the normal walking speed of the players. The cart runs along the exposed surfaces of the rail with front and rear wheels 21 in rolling contact therewith. Channel members 1 forming the rail may have a total width of about 130 mm. The portions of the channel members with the maximum width are buried beneath the ground. The channel member 1 is exposed only at the exposed surface 5 which is defined by top surfaces of flanges 2 and groove 4 therebetween. Each front and rear wheel member rolling on exposed surface 5 is formed of two wheel members 21, each of a width of about 20 mm, the two wheels 21 being assembled together with a vertical shaft 13 (of about 30 to 35 mm in diameter) therebetween. The cart accordingly would not stand upright stably by wheels 21 alone, no matter how evenly distributed is the weight, particularly when the cart is on a slope. However, by the provision of the structures 14 of the present invention, the cart is prevented from turning over sideways. Each device 14 is formed mainly by vertical rollers 18 in contact with lower surfaces of flanges 2, and horizontal rollers 20 which rotate in contact with inner surfaces 19 of the side walls of the channel member. This arrangement ensures stable and smooth movement of the cart over the terrain of the golf course which can include slopes and curves. If, for example, the cart 8 is inclined to the right, then the lefthand vertical roller 18 is pressed strongly against the lower surface 17 of the left flange 2, thus preventing further inclination of the cart. The righthand horizontal roller 20 or the righthand portion of a single roller 20 comes into contact with the inner surface 19 of the righthand wall to assist the lefthand vertical roller 18 in preventing further inclination of the cart. Movement of the cart along a curve in the rail is smoothed by rotation of the vertical rollers 18.

When the cart is of the self-driven type, for example as shown in FIGS. 1 and 2, the cart will run stably in the manner described above. However, difficulty arises in connection with the manner of supporting the tow rope 28 when the cart is of the towed type, as shown in FIGS. 3 and 4. This problem however is overcome in accordance with a further feature of the present invention.

Thus, with reference to FIGS. 3 and 4, tow rope 28 is clamped by attachment device 25 so that the rope moves away from support roller 29 and guide roller 30, whereby the cart is propelled at the speed of the rope 28. The portions of the rope 28 which are not attached or clamped by the device 25 run in contact with the support rollers 29 by the force of gravity in rectilinear sections of the rail, as well as in downwardly curving sections thereof.

However, in sections of the rail which curve laterally, rope 28 is pressed against the guide rollers 30 by the tension therein, such that guide rollers 30 are rotated by a reaction force. A portion of the rope which has been on a support roller 29 slides onto the curved surface of the guide roller 30. The movement of the rope from the support roller 29 to the guide roller 30 is smooth due to the curved surfaces of the two rollers being arranged substantially as extensions of each other. Curves in the rail in the horizontal plane may be formed at any desired curvature by arranging guide rollers 30 at appropriate intervals. However, in upwardly curving regions of, for example, valleys, the rope 28 will tend to spring up from the guide rollers 30 if the rail simply is curved. This problem can be overcome by flexing the path of the rope in the vertical direction. Namely, it has been determined that the rope 28 can be held stably without coming off the guide rollers 30 when the curvature of the rope within the horizontal plane is about 5°, while the rope 28 can bend in the vertical direction within an angular range of not more than 4°, preferably between 2° and 3°.

Figure 6A:
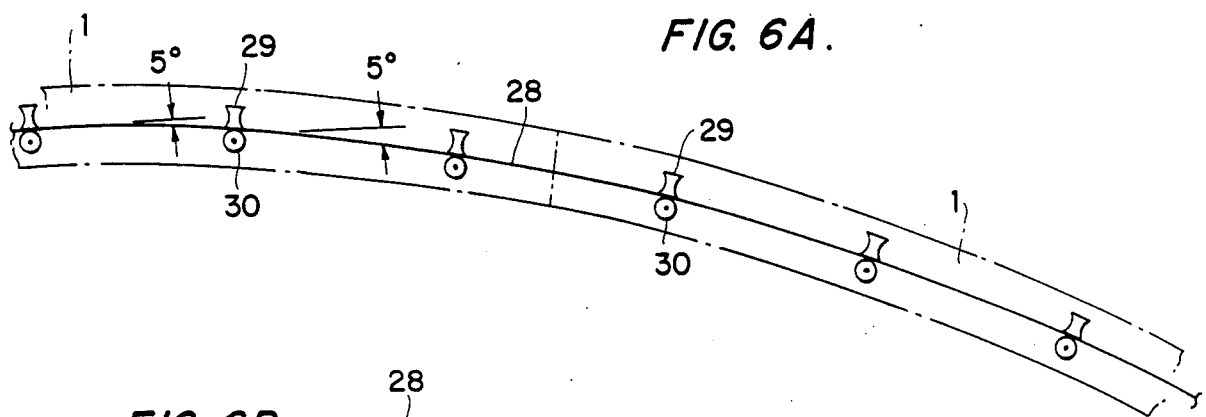
FIG. 6A is a schematic view illustrating the manner of supporting a tow rope through a horizontally curved rail section.
Figure 6B:
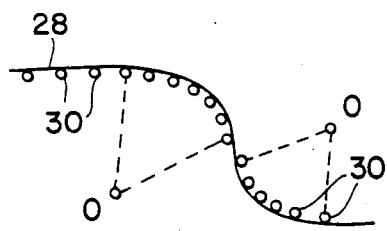
FIG. 6B is an expanded view on a smaller scale schematically illustrating horizontal curvature.

Such relationships will be explained more fully with reference to FIGS. 6A-7B. Referring to FIG. 6A, it will be seen that the rope will be maintained in contact with guide rollers 30 by allowing a rope bend of 5° between adjacent guide rollers. Thus, a 90° bend may be realized by the use of eighteen roller assemblies, with a curvature of 5° around each guide roller 30. It will be apparent that in regions having such curves, it is necessary that the tow rope 28 be pressed against guide rollers 30 located on that side of the rail directed toward the center of the curvature. This relationship is shown in FIG. 6B.

Figure 7A:
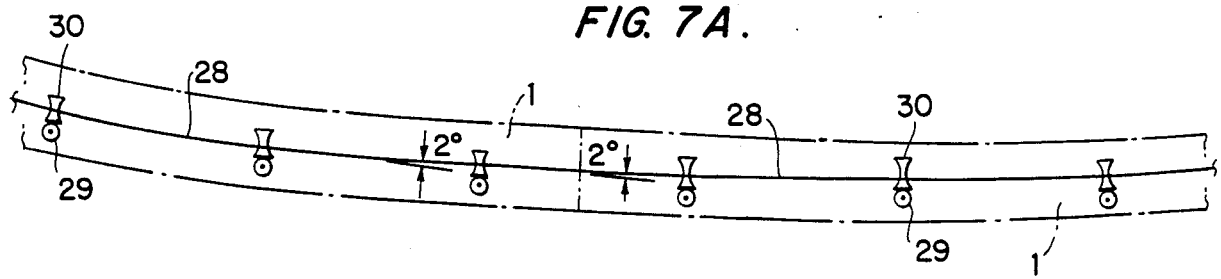
FIG. 7A is a view similar to FIG. 6A, but illustrating the manner of enabling vertical curvature of the tow rope.
Figure 7B:
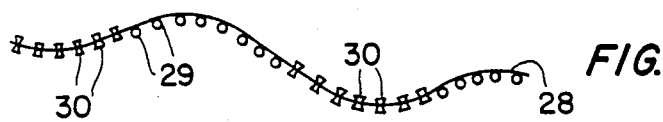
FIG. 7B is a view similar to FIG. 6B, showing vertical curvature over a greater extent and at a reduced scale.

Bending of the rope vertically is achieved, as will be apparent from a consideration of FIGS. 7A and 7B by allowing a bend of approximately 2° of the rope 28 around each guide roller 30 at a spacing such that the rope 28 does not come off the curved surfaces of adjacent guide rollers 30.

As a further feature of the present invention, it will be apparent that it would be inefficient to arrange successive assemblies of pairs of guide and support rollers to include simply one guide roller, since different assemblies would require that the guide rollers be at opposite sides of the rail. Thus, each assembly may be provided with three rollers, i.e. a bottom support roller and guide rollers on left and right sides. Construction and maintenance thereby are facilitated.

Although the present invention has been described and illustrated with respect to preferred features thereof, it is to be understood that various changes and modifications may be made to the specifically and illustrated features without departing from the scope of the present invention.

I claim:

1. A golf cart system comprising:
   a rail formed by a plurality of channel members, each said channel member having a U-shaped cross section defined by spaced side walls joined at lower ends thereof by a bottom wall, said side walls having at upper ends thereof flanges extending inwardly toward each other and defining therebetween a longitudinal groove, said channel members being buried in the ground to define said rail extending through selected locations of a golf course with portions of said flanges flush with the ground surface and with said longitudinal grooves of said channel members defining a continuous groove;
   a golf cart having front and rear wheel members running on said flange portions of said rail, each said wheel member having a width no greater than the width of said flange portions, thereby preventing said wheel members from running on grass on either side of said rail; and
   means for preventing said golf cart from falling sideways from said rail, said means comprising at least one vertical shaft attached to said golf cart and extending downwardly therefrom, through said groove into the interior of said rail, a horizontal shaft extending from said vertical shaft, said horizontal shaft defining vertical portions, plural vertical rollers mounted on said horizontal shaft for rotation in respective vertical planes in contact with inner surfaces of respective said flanges, and plural horizontal rollers mounted on said vertical portions for rotation in a horizontal plane in contact with said inner surfaces of respective said side walls.

2. A system as claimed in claim 1, further comprising a tow rope extending movably through the interior of said rail, means on said golf cart for attaching said golf cart to said tow rope such that said gold cart is pulled thereby along said rail, and means within said rail for supporting said tow rope therein, said tow rope supporting means comprising a plurality of roller assemblies mounted within said rail, each said assembly comprising separate support and guide rollers having respective substantially horizontal and vertical axes extending in the same plane transverse to the longitudinal dimension of said rail, each said support and guide roller having the form substantially of a cylinder constricted at the mid-portion thereof, thus defining a curved surface, said support and guide rollers of each said assembly being positioned such that said curved surfaces thereof substantially are extensions of each other.

3. A golf cart system comprising:

a rail formed by a plurality of channel members, each said channel member having a U-shaped cross section defined by spaced side walls joined at lower ends thereof by a bottom wall, said side walls having at upper ends thereof flanges extending inwardly toward each other and defining therebetween a longitudinal grooe, said channel members being buried in the ground to define said rail extending through selected locations of a golf course with portions of said flanges flush with the ground surface and with said longituindal grooves of said channel members defining a continuous groove;

a golf cart having front and rear wheel members running on said flange portions of said rail, each said wheel member having a width no greater than the width of said flange portions, whereby preventing said wheel members from running on grass on either side of said rail; and means for preventing said golf cart from falling sideways from said rail, said means comprising at least one vertical shaft attached to said golf cart and extending downwardly therefrom, through said groove into the interior of said rail, plural vertical rollers mounted on said vertical shaft for rotation in respective vertical planes in contact with inner surfaces of respective said flanges, and a single horizontal roller mounted on said vertical shaft at a position below said vertical rollers for rotation in a horizontal plane in contact with inner surfaces of said side walls of said channel members.

4. A system as claimed in claim 3, further comprising a tow rope extending movably through the interior of said rail, means on said golf cart for attaching said golf cart to said tow rope such that said golf cart is pulled thereby along said rail, and means within said rail for supporting said tow rope therein, said tow rope supporting means comprising a plurality of roller assemblies mounted within said rail, each said assembly comprising separate support and guide rollers having respective substantially horizontal and vertical axes extending in the same plane transverse to the longitudinal dimension of said rail, each said support and guide roller having the form substantially of a cylinder constricted at the mid-portion thereof, thus defining a curved surface, said support and guide rollers of each said assembly being positioned such that said curved surfaces thereof substantially are extensions of each other.

5. A golf cart system comprising:

a rail formed by a plurality of channel members, each said channel member having a U-shaped cross section defined by spaced side walls joined at lower ends thereof by a bottom wall, said side walls having at upper ends thereof flanges extending inwardly toward each other and defining therebetween a longitudinal groove, said channel members being buried in the ground to define said rail extending through selected locations of a golf course with portions of said flanges flush with the ground surface and with said longitudinal grooves of said channel members defining a continuous groove;

a golf cart having front and rear wheel members running on said flange portions of said rail, each said wheel member having a width no greater than the width of said flange portions, thereby preventing said wheel members from running on grass on either side of said rail; and means for preventing said golf cart from falling sideways from said rail, said means comprising at least one vertical shaft attached to said golf cart and extending downwardly therefrom, through said groove into the interior of said rail, a horizontal shaft extending from said vertical shaft, plural vertical rollers being mounted on said horizontal shaft for rotation in respective vertical planes in contact with inner surfaces of respective said flanges, and a horizontal roller mounted to rotate about outer ends of said horizontal shaft in a horizontal plane in contact with inner surfaces of said side walls of said channel members.

6. A system as claimed in claim 5, further comprising a tow rope extending movably through the interior of said rail, means on said golf cart for attaching said golf cart to said tow rope such that said golf cart is pulled thereby along said rail, and means within said rail for supporting said tow rope therein, said tow rope supporting means comprising a plurality of roller assemblies mounted within said rail, each said assembly comprising separate support and guide rollers having respective substantially horziontal and vertical axes extending in the same plane, transverse to the longitudinal dimension of said rail, each said support and guide roller having the form substantially of a cylinder constricted at the mid-portion thereof, thus defining a curved surface, said support and guide rollers of each said assembly being positioned such that said curved surfaces thereof sbustantially are extensions of each other.

* * * * *